United States Patent
Trattler et al.

(10) Patent No.: US 9,306,413 B2
(45) Date of Patent: Apr. 5, 2016

(54) CHARGING CIRCUIT FOR A CHARGE ACCUMULATOR AND METHOD FOR CHARGING THE SAME

(75) Inventors: Peter Trattler, Graz (AT); Manfred Pauritsch, Graz (AT)

(73) Assignee: ams AG, Unterpremstaetten (AT)

( * ) Notice: Subject to any disclaimer, the term of this patent is extended or adjusted under 35 U.S.C. 154(b) by 1043 days.

(21) Appl. No.: 13/265,477

(22) PCT Filed: Mar. 30, 2010

(86) PCT No.: PCT/EP2010/054251
§ 371 (c)(1),
(2), (4) Date: Jan. 23, 2012

(87) PCT Pub. No.: WO2010/121896
PCT Pub. Date: Oct. 28, 2010

(65) Prior Publication Data
US 2012/0119710 A1 May 17, 2012

(30) Foreign Application Priority Data
Apr. 20, 2009 (DE) .......................... 10 2009 018 098

(51) Int. Cl.
*H02J 7/00* (2006.01)
*H02J 7/34* (2006.01)
*H05B 33/08* (2006.01)

(52) U.S. Cl.
CPC .............. *H02J 7/345* (2013.01); *H05B 33/089* (2013.01); *H02J 7/0081* (2013.01)

(58) Field of Classification Search
USPC .................................................. 320/166–167
See application file for complete search history.

(56) References Cited

U.S. PATENT DOCUMENTS

2002/0105373 A1 8/2002 Sudo
2005/0248322 A1 11/2005 Kagemoto et al.
(Continued)

FOREIGN PATENT DOCUMENTS

DE 102005012663 A1 9/2006
DE 102005030123 A1 1/2007
(Continued)

OTHER PUBLICATIONS

Anonymous, "Driver for Supercap-Based Camera LEDs Delivers 4 A", Mobile Dev Design, Jan. 22, 2009, http://mobiledevdesign.com/tecnologies/driver-supercap-based-camera-leds-delivers-4.
(Continued)

*Primary Examiner* — Samuel Berhanu
(74) *Attorney, Agent, or Firm* — McDermott Will & Emery LLP (57) ABSTRACT

In one embodiment, a charging circuit for a charge accumulator comprises a first terminal (A1) for supplying a charging voltage (UC) and for connecting the charge accumulator (SC) connected to a reference potential terminal (10), a second terminal (A2) for providing a load voltage (UD) and for connecting an electrical load (D1), a control assembly (ST) which is coupled to the first and the second terminals (A1, A2) and has a signal output (A3) for providing a first charge state signal (S1) and a test output (TA) for providing at test signal (on), and a current source (I1) that is coupled to the second terminal (A2), wherein the first charge state signal (S1) is provided depending on a value of an additional voltage (U12) between the first and the second terminals (A1, A2) and depending on the test signal (on), and wherein the charging voltage (UC) is supplied depending on the first charge state signal (S1). The invention also relates to a method for charging a charge accumulator.

17 Claims, 3 Drawing Sheets

(56) References Cited

U.S. PATENT DOCUMENTS

| | | |
|---|---|---|
| 2006/0186830 A1 | 8/2006 | Shami et al. |
| 2006/0220570 A1 | 10/2006 | Evans et al. |
| 2007/0216359 A1* | 9/2007 | Arai et al. .................... 320/130 |
| 2007/0297782 A1 | 12/2007 | Kleverman et al. |
| 2008/0042597 A1 | 2/2008 | Hebborn |
| 2008/0054815 A1 | 3/2008 | Kotikalapoodi et al. |
| 2008/0129219 A1 | 6/2008 | Smith et al. |
| 2009/0108775 A1 | 4/2009 | Sandner et al. |
| 2009/0167260 A1 | 7/2009 | Pauritsch et al. |
| 2009/0174345 A1 | 7/2009 | Vaucourt et al. |
| 2009/0179589 A1 | 7/2009 | Buehler et al. |
| 2010/0181973 A1 | 7/2010 | Pauritsch et al. |

FOREIGN PATENT DOCUMENTS

| | | |
|---|---|---|
| DE | 10 2007 014 398 | 10/2008 |
| DE | 102007014384 A | 10/2008 |
| DE | 102007014398 A1 | 10/2008 |
| DE | 102007051793 A | 5/2009 |
| EP | 1 511 088 | 5/2003 |
| EP | 1499165 A2 | 1/2005 |
| WO | WO 2007/090644 | 8/2007 |
| WO | WO-2007090644 A1 | 8/2007 |
| WO | WO 2009/040305 | 4/2009 |
| WO | WO-2009040305 A1 | 4/2009 |

OTHER PUBLICATIONS

Anonymous, "LED Flash Driver IC Packs 4A Wallop", Electronic Design, EE Product News, Oct. 8, 2008.

Mars, P., "Use supercapacitors to drive a white Led camera flash", EE times, May 13, 2005.

Morrison, D., "Driver ICs Boost Prospects for LED Flash", Power Electronic Technology, May 2008, pp. 38-40.

Vaucourt, C., "Driving High Power Led Camera Flash", Power Electronics Europe, Issue 4, 2008, pp. 43-47.

Datasheet CAT3224 "4 Amp Supercapacitor Flash LED Driver" Semiconductor Components Industries, LLC, Dec. 2009.

* cited by examiner

CHARGING CIRCUIT FOR A CHARGE ACCUMULATOR AND METHOD FOR CHARGING THE SAME

RELATED APPLICATIONS

This application is a U.S. National Phase Application under 35 USC 371 of International Application PCT/EP2010/054251 filed Mar. 30, 2010.

This application claims the priority of German application No. 10 2009 018 098.2 filed Apr. 20, 2009, the entire content of which is hereby incorporated by reference.

BACKGROUND OF THE INVENTION

A charge accumulator is used, for example, to provide the energy needed to operate a flash lamp diode at the instant that the flash is triggered. Conventional capacitors or so-called super-caps are used as charge accumulators. A super-cap has the advantage that a high capacitance, in the farad range, for example, is available on a small surface area. Due to the low internal resistance, a high current can be output for short periods, with a low voltage drop at the super-capacitor.

In a conventional circuit, such a charge accumulator for operating a flash lamp diode coupled to a current source is charged by means of a DC/DC converter that is supplied with energy by an energy source such as a battery. The flash can be triggered after the charge accumulator has been charged up to the fixed value of a maximum voltage. Because the value of the maximum voltage is fixed, considerably more energy is stored in the charge accumulator than is necessary, depending on the forward or conducting state voltage of the flash lamp diode. This energy on the one hand must be supplied by the energy source and on the other hand must be dissipated during triggering. Since the currents required for a flash lamp diode are in the range of 2 to 5 A, the excess energy that must be drained from the current source coupled to the flash lamp diode is very large. This makes integration of this current source difficult. In some cases, rather large surface areas are needed for cooling. At the same time high requirements are placed on the energy source.

SUMMARY OF THE INVENTION

One objective of the present invention is to provide an improved charging circuit for a charge accumulator, as well as an improved method for charging the same.

In one embodiment, a charging circuit for a charge accumulator comprises a first terminal, a second terminal, a control assembly and a current source. The first terminal is designed to supply a charging voltage and for connection of the charge accumulator connected to a reference potential. The second terminal is designed to provide a load voltage and for connection of an electrical load. The control assembly is coupled to the first and second terminals and has an output for providing a first charge state signal as well as a test output for providing a test signal. The current source is coupled to the second terminal. The first charge state signal is provided depending on a value of an additional voltage between the first and the second terminal, as well as depending on the test signal. The charging voltage is supplied as a function of the first charge state signal.

The charge accumulator is charged by supplying the charging voltage until a defined value of the additional voltage drops between the first and second terminals, so that the load voltage is provided at the required level. As soon as this value of the additional voltage is achieved depending in time on the test signal, the first charge state signal is generated and the charging voltage is shut off. The charging cycle is complete.

Using the charging circuit, the charge accumulator is charged until it provides exactly the amount of energy required for the operation of the electrical load over the entire time in which the load is switched on. Firstly this reduces the power consumption during charging and secondly it reduces the lost power that must be dissipated in the current source. This advantageously enables the integration of the current source, or reduces the cooling area and thereby the costs.

The electrical load comprises a flash lamp diode, for example. The load voltage, for example, comprises the on-state or forward voltage of the flash lamp diode. The electrical load is connected to the reference potential terminal.

The current source is either connected between the first and second terminals or coupled to the second terminal and connected to the reference potential terminal.

In another embodiment, a target value of the additional voltage is formed as a function of the charging voltage from a sum comprising a minimum voltage of the current source and a delta voltage of the charge accumulator.

The minimum voltage of the current source comprises, for example, the least voltage that is required in order to operate the current source. The delta voltage of the charge accumulator comprises, for example, the voltage drop at the charge accumulator that appears when the energy stored in the charge accumulator is output. The value of the delta voltage is dependent, for example, on the discharge of the charge accumulator and on its internal resistance.

Because the minimum voltage of the current source, the delta voltage of the charge accumulator and the required load voltage are taken into consideration in charging the charge accumulator, the charge accumulator can be charged to precisely the energy that is required to operate the electrical load. Charging is therefore done adaptively.

In a refinement, the current source can be switched as a function of the test signal.

When the test signal is applied, the current source is briefly switched on and back off. In this process, the control assembly acquires the actual value of the additional voltage dropping across the current source, i.e. also the value of the load voltage provided at the second terminal.

In another embodiment, the charge accumulator comprises a capacitor or a super-cap.

In a refinement, the control assembly comprises an adjustable voltage source coupled to the first terminal, a first comparator, a logic unit and a pulse generator. The voltage source is designed to provide a summation voltage. The first comparator has an inverting input that is coupled to the adjustable voltage source, a non-inverting input that is coupled to the second terminal and an output that is coupled to an input of the logic unit. The logic unit is connected to the signal output and has a control output for driving the pulse generator. The pulse generator is connected to the test output.

The summation voltage is added to the charging voltage present at the first terminal of the charging circuit and is compared in the first comparator to the load voltage present at the second terminal. The pulse generator generates the test signal, which has square test pulses, for example. A test pulse of the test signal causes the current source and the load connected to it to be briefly turned on, i.e., a test flash triggered thereby, for example. The logic unit evaluates the output signal of the first comparator at the time a test pulse provided at the pulse generator is present. If the value of the additional voltage has reached its target value at the time the test pulse arrives, the logic unit generates the first charge state signal, whereby the charging voltage is switched off.

The respective actual value of the required load voltage is advantageously taken into account by means of a test pulse of the test signal. Thereby the precisely required value for charging the charge accumulator can be taken into account.

The logic unit is preferably constructed digitally.

In another embodiment, a first memory cell for storing the target value of the additional voltage is coupled to the first comparator.

The storage of the target value for the additional voltage makes it possible to determine this value by a single switching on and off of the current source, so that it can be done during the production and need not be undertaken in operation.

In one refinement, a second memory cell coupled to the first comparator is provided for storing the target value of the load voltage.

A subsequent charging cycle can be further improved with the aid of the stored target value of the load voltage. Aging effects are taken into account.

The respective memory cell is implemented in the form of a RAM, an EEPROM or a one-time writable memory cell OTP.

In another embodiment, the logic unit comprises means for measuring the load voltage relative to a temperature and means for adapting the target value of the load voltage based on that measurement.

Thereby temperature effects that influence the load voltage, i.e., the forward voltage of a flash lamp diode for example, are acquired and compensated.

For this, in one possible implementation, the temperature of the electrical load is detected with a negative temperature coefficient thermistor NTC. The measured temperature is taken into account, starting from the known temperature dependency, for example −5 mV per degree Celsius, of the load, such as a flash lamp diode. The consequent change of the load voltage is compensated.

Alternatively, the temperature is determined approximately by measuring the ambient temperature such as the temperature of the chip.

Alternatively, the temperature of the electrical load is determined by measuring the load voltage for two different current values according to a so called PTAT (proportional to absolute temperature) method.

In another embodiment, the charging circuit comprises at least one additional terminal, which is coupled to the control assembly, and at least one additional current source, which is coupled to the first terminal and the at least one additional terminal. The at least one additional current source is switchable as a function of the test signal and is designed for providing an additional load voltage and for connecting an additional electrical load connected to the reference potential terminal. The first charge state signal is also provided as a function of the value of at least one further additional voltage between the first and the at least one additional terminal.

Thereby any desired number of electrical loads such as flash lamp diodes can be operated with the aid of the charging circuit and the charge accumulator. Each additional electrical load is connected via an additional current source to the first terminal, in parallel to the first load and its current source. A target value of the at least one further additional voltage is calculated analogously to the target value of the first additional voltage from a sum comprising the minimum voltage of the at least one additional current source and the delta voltage of the charge accumulator.

In a refinement, the control assembly comprises at least one additional comparator with an inverting input that is coupled to the inverting input of the first comparator, with a non-inverting input that is coupled to the at least one additional terminal and with an output that is coupled to the at least one additional input of the logic unit.

For detecting and adjusting a further additional voltage and a respective further load voltage, a respective comparator is connected in parallel to the first comparator. The first charge state signal is determined by an AND linkage of the output signals of all comparators in the logic unit. This ensures that the additional voltage required in each case is present at all connected current sources.

In another embodiment, the control assembly has at least one sample and hold element connected between the inverting input of the first comparator and the second terminal. The test signal is supplied to a control input of the sample and hold element. The sample and hold element is designed to acquire a value of the load voltage as a function of the test signal and to hold this value.

With the sample and hold element, it becomes possible to acquire a value of the load voltage, save this value and supply it to the first comparator with only one test pulse of the test signal. This further optimizes the charging circuit.

The sample and hold element is alternatively realized as an analog/digital converter and digital/analog converter with a connected memory cell. The latter stores the target value of the additional voltage inside the control assembly. The target value can be stored in a nonvolatile memory, for example. Thereby only one calibration is necessary in production.

In another embodiment, the charging circuit has an auxiliary current source that is coupled to the second terminal and to which an auxiliary voltage is supplied as a function of the charging voltage. The auxiliary current source is switchable as a function of the test signal.

The auxiliary current source is required for determining the value of the load voltage and is not used in the actual operation of the electrical load, i.e. when triggering the flash lamp diode for instance. In order to take the difference between the voltage drop at the current source and at the auxiliary current source into account, a buffering value is added to the summation voltage.

In a refinement, the control assembly comprises a maximum value unit that is connected on the output side to the sample and hold element, and the load voltage as well as at least the additional load voltage are supplied to it. The maximum value unit is designed to determine a highest value of the supplied load voltages.

If several loads are being operated on the charging circuit, the maximum value unit is connected upstream of the sample and hold element. It acquires the maximum value of the load voltages of the connected loads.

Here too, a single test pulse of the test signal is advantageously sufficient in order to determine the target value of a respective additional voltage.

In another embodiment, the charging circuit comprises a second comparator and a logic gate. The second comparator has a non-inverting input connected to the first terminal, an inverting input to be fed a maximum voltage and an output for providing a second charge state signal. The logic gate comprises one input to be fed the first charge state signal, an additional input to be fed the second charge state signal and an output for providing a shutoff signal.

The charging voltage is compared to the maximum voltage with the aid of the second comparator. The second charge state signal is provided as soon as the charging voltage exceeds the value of the maximum voltage. This signal is combined with the first, charge state signal in the logic gate. The shutoff signal results from this combination.

Thereby the charging voltage can advantageously be adjusted to a maximum voltage.

The logic gate comprises an OR gate, for example, so that the shutoff signal is generated either if the first charge state signal is present, i.e., if the target value of the additional voltage is present at the current source, or if the second charge state signal is present, if the charging voltage has reached the value of the maximum voltage.

In one embodiment, a drive circuit comprises a charging circuit as well as a DC/DC converter. The DC/DC converter comprises one input for connection of an energy source connected to the reference potential terminal, a control input to be fed the shutoff signal and an output for providing the charging voltage as a function of the shutoff signal The energy supplied by the energy source is converted with the aid of the DC/DC converter into the charging voltage. The connectable charge accumulator is charged by the charging voltage until the shutoff signal is present and the charging cycle has ended.

In one embodiment, a method for charging a charge accumulator has the following steps:
  supplying a charging voltage to the charge accumulator,
  switching on a current source coupled to the charge accumulator or an auxiliary current source coupled to the charge accumulator,
  determining an additional voltage dropping as a function of the charging voltage,
  switching off the current source or the auxiliary current source,
  checking whether a determined value of the additional voltage has reached a value of a summation voltage,
  if yes, providing a first charge state signal and ending the charging, and
  if no, continuing to supply the charging voltage.

The charging voltage is supplied to the charge accumulator until a value of the additional voltage has reached the value of a summation voltage.

The additional voltage drops between the first and the second terminal. The additional voltage preferably drops at the current source coupled to the charge accumulator.

In one refinement, the method comprises the steps:
  checking whether a value of the charging voltage has reached a value of a maximum voltage,
  if yes, providing a second charge state signal and ending the charging, and
  if no, continuing to supply the charging voltage.

As soon as the charging voltage has reached the value of the maximum voltage, the charging cycle is ended.

It is advantageously possible with the method to charge the charge accumulator precisely up to a required energy value. Thereby the power consumption and the lost power are minimized.

BRIEF DESCRIPTION OF THE DRAWINGS

The invention will be described in detail below for several exemplary embodiments with reference to the figures. Components and circuit elements that are functionally identical or have the identical effect bear identical reference numbers. Insofar as circuit parts or components correspond to one another in function, a description of them will not be repeated in each of the following figures.

Therein.

DETAILED DESCRIPTION OF THE DRAWINGS

Figure 1:
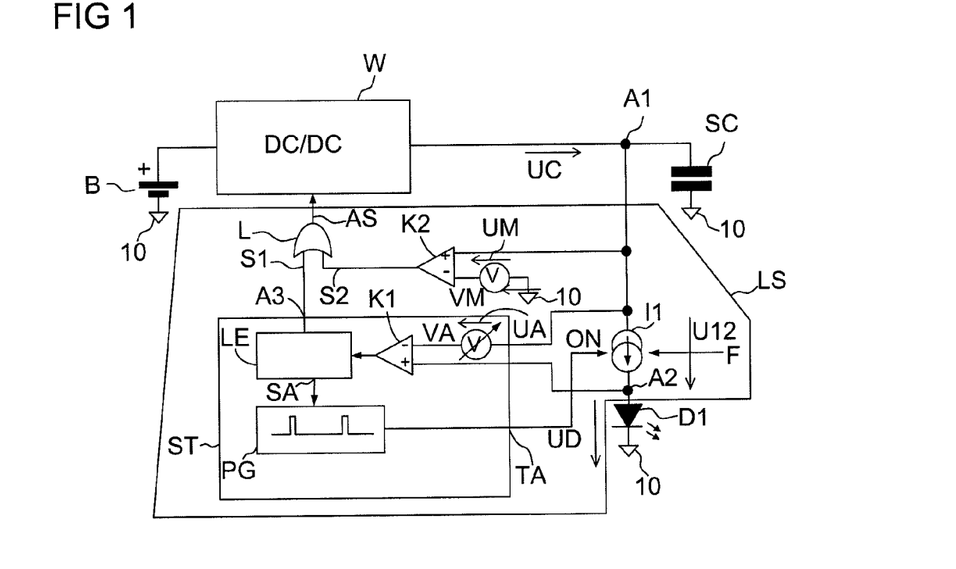
FIG. 1 shows a first exemplary embodiment of a drive circuit according to the invention.

FIG. 1 shows a first exemplary embodiment of a drive circuit according to the invention proposed principle. The drive circuit comprises a charging circuit LS and a DC/DC converter W. The charging circuit LS has a first terminal A1 and a second terminal A2. One output of the converter W is connected to the first terminal A1 of the charging circuit LS. Also shown are an energy source B connected to a reference potential terminal 10 and connected to one input of the converter W, a charge accumulator SC connected to the first terminal A1 and an electrical load D1 coupled to the second terminal A2. The charge accumulator SC and the electrical load D1 are connected to the reference potential terminal 10 with their respective other terminals. The electrical load D1 is configured for the sake of example as a flash lamp diode. The converter W is implemented as an inductive or capacitive DC/DC converter. The energy source B comprises, for example, a battery. The charge accumulator SC is implemented for the sake of example as a super-cap.

The charging circuit LS comprises a current source I1 connected between the first terminal A1 and the second terminal A2, a control assembly ST, a logic gate L, a second comparator K2 and a maximum voltage source VM. A non-inverting input of the second comparator K2 is connected to the first terminal A1. An inverting input of the second comparator K2 is connected to the maximum voltage source VM connected to the reference potential terminal 10 in order to supply a maximum voltage UM. One input of the logic gate L is coupled to a signal output A3 of the control assembly ST in order to receive a first charge state signal S1. A second input of the logic gate L is coupled to the output of the second comparator K2 in order to receive a second charge state signal S2. An output of the logic gate L is connected to a control input of the converter W in order to provide a shutoff signal AS.

The control assembly ST has a logic unit LE, a pulse generator PG, a first comparator K1 and a voltage source VA. The logic unit LE may be implemented as a PIC 16F1503 microcontroller manufactured by Microchip Technology, Inc. of Chandler, Ariz., U.S.A. The voltage source VA is coupled on one side to the first terminal A1 of the charging circuit LS and on the other to the inverting input of the first comparator K1. The voltage source VA provides an adjustable summation voltage UA. A non-inverting input of the first comparator K1 is connected to the second terminal A2 of the charging circuit LS. An output of the first comparator K1 is coupled to an input of the logic unit LE. A control output SA of the logic unit LE is connected to an input of the pulse generator PG. An output of the pulse generator PG is connected to a test output TA of the control assembly ST in order to provide a test signal ON. The test output TA is coupled to the current source I1 in order to control it.

The adjustable summation voltage UA provided by the voltage source VA comprises a sum having a minimum voltage of the current source I1 and a delta voltage of the charge accumulator SC. The delta voltage of the charge accumulator SC corresponds to a voltage drop at the charge accumulator SC in the course of providing the stored charge. The minimum voltage of the current source I1 corresponds to the least voltage that is required to operate the current source I1. The maximum voltage UM is a maximum value of a voltage to which the charge accumulator SC can be charged.

With the aid of the energy source B, the converter W provides a charging voltage UC at its output as a function of the shutoff signal AS. The charging voltage UC is fed to the first terminal A1, i.e., both to the charging circuit LS and to the charge accumulator SC. The current source I1 is turned on and off several times by the test signal ON. During the brief on-times, an additional voltage U12 dropping across the current source I1 is checked, taking into account a load voltage UD dropping at the flash lamp diode D1, with respect to whether a voltage of the charge accumulator SC is sufficient to trigger the flash lamp diode D1 by means of a trigger signal F. The additional voltage U12 is adjusted with the aid of the summation voltage UA. As soon as the additional voltage U12 has reached its target value, namely the value of the summation voltage UA, the output of the first comparator K1 switches. If a test pulse of the test signal ON is present, the logic unit LE evaluates this result and provides the result at the signal output A3 in the form of the first charge state signal S1. Consequently the output of the logic gate L, implementing an OR function for the sake of example, switches and the shutoff signal AS effects a shutoff of the converter W as well as a shutoff of the charging voltage UC. The charging cycle is terminated.

The second comparator is used to check simultaneously whether the voltage at the charge accumulator SC has reached the value of the maximum voltage UM. As soon as this is the case, the output of the logic gate L is switched via the second charge state signal S2, whereby the converter W is turned off by the shutoff signal AS.

As long as neither the first nor the second charge state signal S1 or S2 is present, the converter W continues to provide the charging voltage UC at its output.

Because the charge accumulator SC is charged to exactly the voltage value that is required during the triggering of the flash lamp diode D1, the power consumption is minimized. At the same time, dissipation of excess energy in the current source I1 is not required. This allows the integration of the current source I1 if the illustrated drive circuit is realized on a chip.

Figure 2:
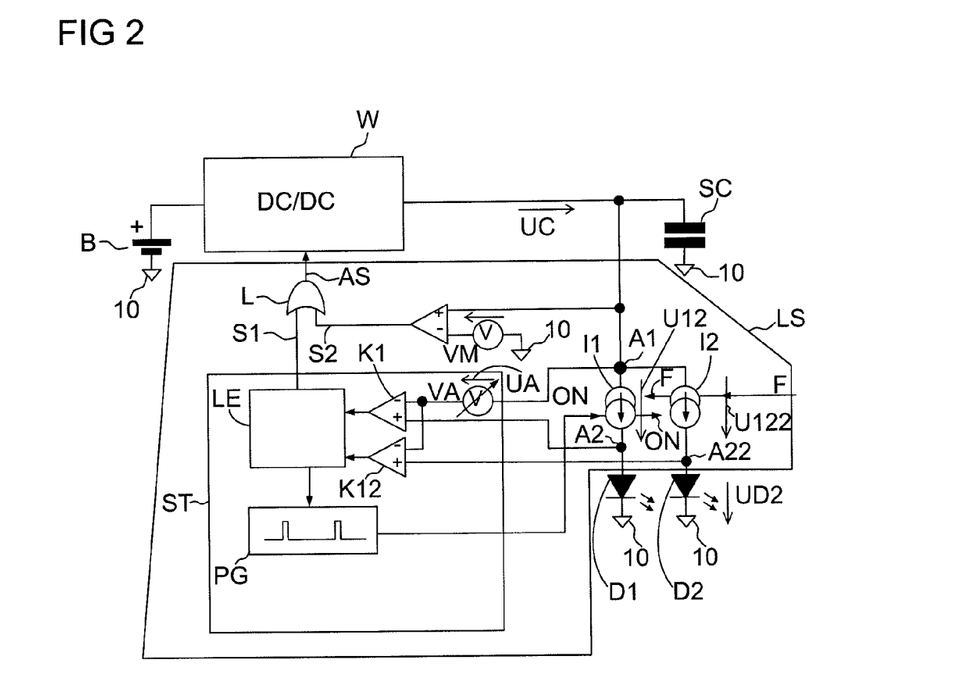
FIG. 2 shows a second exemplary embodiment of a drive circuit according to the invention.

FIG. 2 shows a second exemplary embodiment of a drive circuit according to the invention. This drive circuit corresponds to the drive circuit from FIG. 1, with an additional terminal A22 provided in order to connect an additional electrical load D2. The additional electrical load D2 is likewise configured as a flash lamp diode for the sake of example. The charging circuit LS additionally comprises another current source I2, which is connected on one side to the first terminal A1 and on the other side to the additional terminal A22. The additional current source I2 can likewise be switched with the test signal ON. A further additional voltage U122 drops across the additional current source I2. The additional current source I2 provides an additional load voltage UD2. An additional comparator K12 is provided inside the control assembly ST to detect and adjust the further additional voltage U122. An inverting input of the additional comparator K12 is connected to the inverting input of the first comparator K1. A non-inverting input of the second comparator K12 is connected to the additional terminal A22. An output of the additional comparator K12 is coupled to the logic unit LE. The output signal of the first comparator K1 is linked in the logic unit LE in an AND function to an output signal of the additional comparator K12.

Simultaneously with the additional voltage U12, a value of the further additional voltage U122 is charged to the value of the summation voltage UA in a manner corresponding to that described under FIG. 1 by supplying the charging voltage UC. If both the additional voltage U12 and the further additional voltage U122 have reached this value, then the first charge state signal S1 is sent and the converter W is switched off via the shutoff signal AS.

As many additional electrical loads as desired can be connected in parallel according to the same principle and operated with the aid of the drive circuit.

Figure 3:
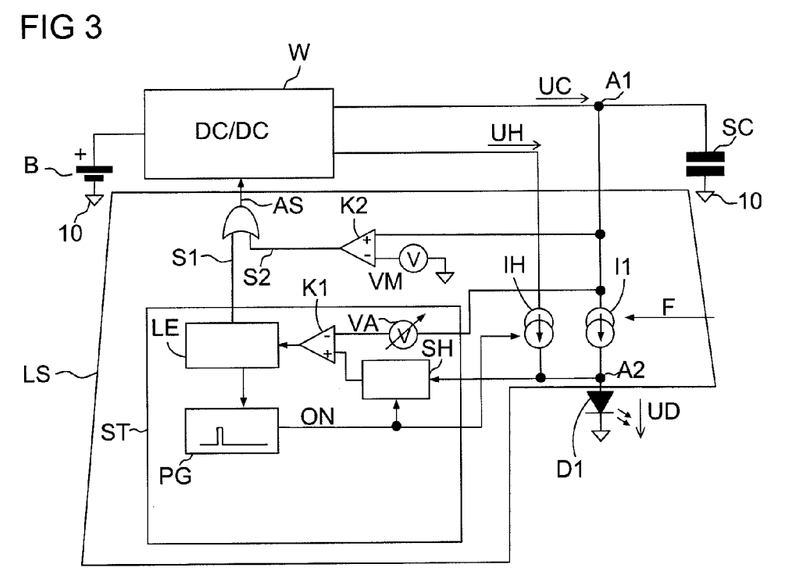
FIG. 3 shows a third exemplary embodiment of a drive circuit according to the inventions.

FIG. 3 shows a third exemplary embodiment of a drive circuit according to the invention. The illustrated drive circuit corresponds to the drive circuit of FIG. 1, with an auxiliary current source IH being additionally provided in the charging circuit LS and a sample and hold element SH being additionally provided in the control assembly ST. An auxiliary voltage UH provided by the converter W as a function of the charging voltage UC is supplied to the auxiliary current source IH. The auxiliary current source IH can be switched by means of the test signal ON. The sample and hold element SH is connected between the second terminal A2 and the non-inverting input of the first comparator K1.

The sample and hold element SH is likewise controlled by the test signal ON via a control input. The sample and hold element SH receives a value of the load voltage UD present at its input at the time the test pulse of the test signal ON is available, holds this value and provides it at its output. In this example, the load voltage UD comprises a forward voltage of the flash lamp diode D1. Thus the charge accumulator SC is charged to a voltage formed from a sum comprising the load voltage UD and the summation voltage UA.

Due to the sample and hold element SH, only a single test pulse of the test signal ON is now required for detecting the target value of the load voltage UD. This single test is preferably performed during production. The sample and hold element SH is preferably configured as an analog/digital converter and digital/analog converter and a nonvolatile memory, so that the target value can be stored even without a supply of power.

Figure 4:
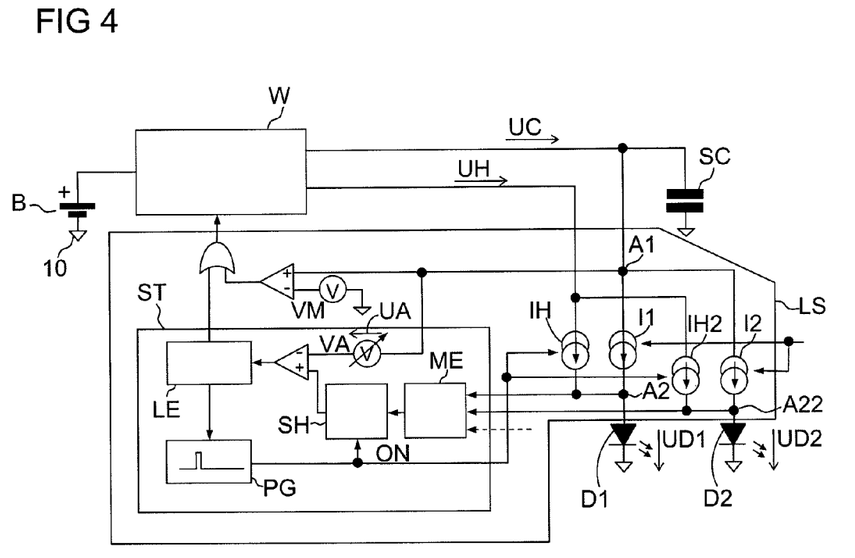
FIG. 4 shows a fourth exemplary embodiment of a drive circuit according to the invention.

FIG. 4 shows a fourth exemplary embodiment of a drive circuit according to the invention. This embodiment corresponds to the embodiment of FIG. 3 with the additional electrical load D2 being connected to the drive circuit in parallel with the electrical load D1. For this purpose, the charging circuit LS, as described in FIG. 2, comprises the additional terminal A22 to which the additional load D2 is connected. The charging circuit LS further comprises the additional current source I2 as well as an additional auxiliary current source IH2. The additional auxiliary current source IH2 is coupled on one side to the output of the converter W in order to supply the auxiliary voltage UH, and on the other to the additional terminal A22. The control assembly ST additionally comprises a maximum value unit ME. The latter is connected upstream of the sample and hold element SH.

The maximum value unit ME determines a maximum value of all values of the load voltages UD1 and UD2 supplied to its inputs. Thus the maximum value of the load voltages UD1 and UD2, i.e. the maximum forward voltage in the case of flash lamp diodes, is taken into consideration when charging the charge accumulator SC.

The sample and hold element SH can alternatively be implemented as an analog/digital converter or digital/analog converter connected with a memory cell for storing the value of the load voltages at which the charging cycle is ended.

In an alternative embodiment, each auxiliary current source IH1, IH2 supplies a current different from the respective current source I1, I2. In order to compensate this, the summation voltage UA is increased accordingly.

Figure 5:
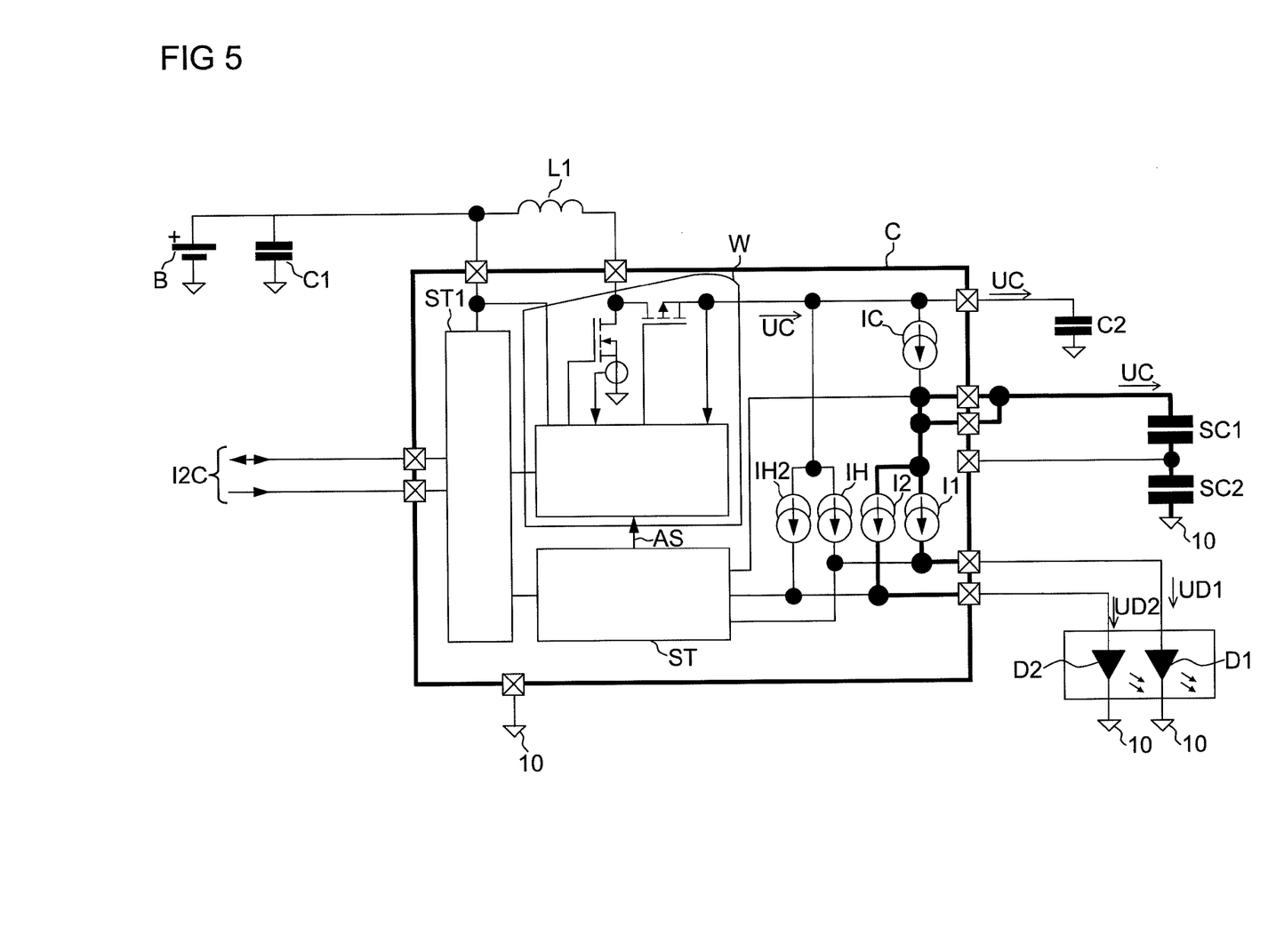
FIG. 5 shows a possible implementation of a drive circuit according to the invention.

In another alternative embodiment, one auxiliary current source after the other is switched on and off and the maximum value of the load voltages for the connected loads is determined FIG. 5 shows an exemplary implementation of a drive circuit according to the invention on a chip. The chip C comprises the converter W, the control assembly ST, an interface controller ST1, a charging current source IC, as well as the current source I1, the additional current source I2, the auxiliary current source IH1 and the additional auxiliary current source IH2. The converter W is constructed as an inductive converter, in conjunction with an externally connected inductor L1. The converter W is supplied with energy by the energy source B via an input capacitor C1. The charging voltage UC provided by the converter W is provided at an output of the chip C via an output capacitor C2. In addition, the charging voltage UC is supplied via the charging current source IC to a first and a second charge accumulator SC1, SC2 at an additional output of the chip C. The two charge accumulators SC1 and SC2 are connected in series and are connected to the reference potential terminal 10. At two additional terminals of the chip C a respective electrical load, e.g. a flash lamp diode D1, D2, is respectively connected.

All current sources I1, I2, IH1, IH2 are advantageously integrated into the chip C, since the connected charge accumulators SC1 and SC2 are advantageously charged according to the invention only to precisely the charging voltage UC required for operating the flash lamp diodes D1 and D2 at the instant when the flash is triggered. Dissipation of excess energy due to a single charging of the first and second charge accumulators SC1 and SC2 to the maximum voltage is unnecessary.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A charging circuit for a charge accumulator, comprising:
a first terminal for supplying a charging voltage and for connecting the charge accumulator connected to a reference potential terminal;
a second terminal for providing a load voltage and for connecting an electrical load;
a control assembly connected to the first and second terminals and comprising a signal output for providing a first charge state signal and a test output for providing a test signal; and
a current source that is coupled to the second terminal,
wherein the first charge state signal is provided as a function of a value of an additional voltage between the first and second terminals and as a function of the test signal, and wherein the charging voltage is supplied as a function of the first charge state signal.

2. The charging circuit according to claim 1, wherein a target value of the additional voltage is formed as a function of the charging voltage from a sum comprising a minimum voltage of the current source and a delta voltage of the charge accumulator, wherein the delta voltage of the charge accumulator comprises a value of a voltage drop at the charge accumulator that appears when the energy stored in the charge accumulator is output.

3. The charging circuit according to claim 1, wherein the current source is switched as a function of the test signal.

4. The charging circuit according to claim 1, wherein the charge accumulator comprises a capacitor or a super-cap.

5. The charging circuit according to claim 1, wherein the control assembly comprises:
an adjustable voltage source coupled to the first terminal for providing a summation voltage;
a first comparator with an inverting input that is coupled to the adjustable voltage source, with a non-inverting input that is coupled to the second terminal and with an output that is coupled to one input of a logic unit;
the logic unit, which is connected to the signal output and has a control output to drive a pulse generator; and
the pulse generator, which is connected to the test output.

6. The charging circuit according to claim 5, wherein a first memory cell coupled to the first comparator is provided to store the target value of the additional voltage.

7. The charging circuit according to claim 5, wherein a second memory cell coupled to the first comparator is provided to store a target value of the load voltage.

8. The charging circuit according to claim 7, wherein the logic unit comprises means for measuring the load voltage relative to a temperature and means for adapting the target value of the load voltage as a function of the measurement.

9. The charging circuit according to claim 1, further comprising:
at least one additional terminal that is coupled to the control assembly; and
at least one additional current source, coupled to the first terminal and the at least one additional terminal, that is switched as a function of the test signal and is configured for providing an additional load voltage and for connecting an additional electrical load connected to the reference potential terminal,
wherein the first charge state signal is also provided as a function of a value of at least one further additional voltage between the first and the at least one additional terminal.

10. The charging circuit according to claim 5, wherein the control assembly comprises at least one additional comparator with an inverting input that is coupled to the inverting input of the first comparator, with a non-inverting input that is coupled to at least one additional terminal and with an output that is coupled to at least one additional input of the logic unit.

11. The charging circuit according to claim 5, wherein the control assembly additionally comprises a sample and hold element connected between the inverting input of the first comparator and the second terminal, with a control input to which the test signal is supplied, wherein the sample and hold element is configured to acquire a value of the load voltage as a function of the test signal and to hold this value of the load voltage.

12. The charging circuit according to claim 1, further comprising an auxiliary current source that is coupled to the second terminal and to which an auxiliary voltage is supplied as a function of the charging voltage, wherein the auxiliary current source is switched as a function of the test signal.

13. The charging circuit according to claim 5, further comprising:
at least one additional terminal that is coupled to the control assembly;
at least one additional current source, coupled to the first terminal and the at least one additional terminal, that is switched as a function of the test signal and is configured for providing an additional load voltage and for connecting an additional electrical load connected to the reference potential terminal, wherein the first charge state signal is also provided as a function of a value of at least one further additional voltage between the first and the at least one additional terminal;

wherein the control assembly additionally comprises a sample and hold element connected between the inverting input of the first comparator and the second terminal, with a control input to which the test signal is supplied, wherein the sample and hold element is configured to acquire a value of the load voltage as a function of the test signal and to hold this value of the load voltage; and wherein the control assembly comprises a maximum value unit (ME) that is connected on the output side to the sample and hold element and to which the load voltage and at least the additional load voltage are fed, wherein the maximum value unit (ME) is configured for determining a highest value of the supplied load voltages.

14. The charging circuit according to claim 1, further comprising;

a second comparator with a non-inverting input connected to the first terminal, with an inverting input to be fed a maximum voltage and with an output for providing a second charge state signal; and a logic gate with an input to be fed the first charge state signal, an additional input to be fed the second charge state signal and an output for providing a shutoff signal.

15. A drive circuit comprising:

the charging circuit according to claim 14, and a DC/DC converter with one input for connection of an energy source connected to the reference potential terminal, with a control input to be supplied with the shutoff signal and with an output for providing the charging voltage as a function of the shutoff signal.

16. A method for charging a charge accumulator comprising the steps of:

supplying a charging voltage to the charge accumulator;

switching on a current source coupled to the charge accumulator or an auxiliary current source coupled to the charge accumulator;

determining an additional voltage dropping as a function of the charging voltage; switching off the current source or the auxiliary current source;

checking whether a determined value of the additional voltage has reached a value of a summation voltage, wherein the summation voltage comprises a sum having a minimum voltage of the current source and a delta voltage of the charge accumulator;

if yes, providing a first charge state signal and ending the charging; and if no, continuing to supply the charging voltage.

17. The method according to claim 16, further comprising:

checking whether a value of the charging voltage has reached a value of a maximum voltage;

if yes, providing a second charge state signal and ending the charging; and if no, continuing to supply the charging voltage.

* * * * *